United States Patent
Brooker

(10) Patent No.: US 9,032,165 B1
(45) Date of Patent: May 12, 2015

(54) SYSTEMS AND METHODS FOR SCHEDULING WRITE REQUESTS FOR A SOLID STATE STORAGE DEVICE

(71) Applicant: Amazon Technologies, Inc., Reno, NV (US)

(72) Inventor: Marc J Brooker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 13/874,143

(22) Filed: Apr. 30, 2013

(51) Int. Cl.
*G06F 12/00* (2006.01)
*G06F 12/08* (2006.01)

(52) U.S. Cl.
CPC .................................. *G06F 12/0806* (2013.01)

(58) Field of Classification Search
None
See application file for complete search history.

(56) References Cited

U.S. PATENT DOCUMENTS

| | | | |
|---|---|---|---|
| 8,176,263 B2 * | 5/2012 | Yamada et al. | 711/147 |
| 8,239,589 B1 | 8/2012 | Certain et al. | |
| 2004/0024971 A1 * | 2/2004 | Bogin et al. | 711/135 |
| 2009/0089524 A1 * | 4/2009 | Fujihara et al. | 711/162 |
| 2011/0138106 A1 * | 6/2011 | Prabhakaran et al. | 711/103 |

* cited by examiner

*Primary Examiner* — Brian Peugh
(74) *Attorney, Agent, or Firm* — Robert c. Kowert; Meyertons, Hood, Kivlin, Kowert & Goetzel, P.C.

(57) ABSTRACT

An I/O scheduler can manage and schedule write requests that are sent to a storage device in order to prevent the write requests from dominating a storage buffer of the storage device. The I/O scheduler can monitor the number of I/O requests in the storage buffer and maintain a balance between write requests and read requests in the storage buffer. The I/O scheduler monitor the latency of the storage device in processing write requests and manage the write requests sent to the storage device based on the latency. The I/O scheduler can utilize one or more write thresholds. The write thresholds can define thresholds of the number of write requests in the storage buffer and thresholds for the latency of the storage device in processing write requests. The write threshold can represent acceptable levels of write request in the storage buffer and acceptable latency for write requests.

21 Claims, 13 Drawing Sheets

350 　　　　Write History
　　　　　　314

| Identification | Sent Time Stamp | Ack. Time Stamp |
|---|---|---|
| Write00001 | 1234567 | 1234568 |
| Write00002 | 1234569 | 1234577 |
| Write00003 | 1234575 | |
| | | |
| | | |
| | | |

FIG. 3B

SYSTEMS AND METHODS FOR SCHEDULING WRITE REQUESTS FOR A SOLID STATE STORAGE DEVICE

BACKGROUND

Traditional operating system input/output schedulers are optimized for magnetic storage devices. Magnetic storage devices differ from solid state storage (e.g. flash memory) in three main properties. First, magnetic storage devices can physically service only a single I/O request at a time. Second, in magnetic storage devices, read and write latencies are approximately equal, and finally I/O latency is sensitive to I/O ordering. In contrast, solid state storage can service multiple I/O requests truly concurrently, read requests are substantially (e.g. 10×) faster than writes requests, and read latency is not sensitive to I/O ordering in the short term. Consequently, computers typically do not use a traditional I/O scheduler with solid state storage. Instead, the computers send the read and write requests directly to the solid state storage.

One drawback with this approach is that the I/O interface to the solid state storage can be limited. Only a small number of read and write request can be issued to the solid state storage at a time (typically 32), through the buffer of the solid state storage (e.g. Native Command Queueing (NCQ) mechanism). As long as there is a mix of reads and writes in the buffer of the solid state storage, the solid state storage can service read requests quickly. However, due to the higher latency (and much higher latency variance) of write requests, write requests can dominate the buffer of the solid state storage. This starves out read requests, and makes I/O latency of the solid state storage device appear to be much higher than it would be with fewer read requests.

BRIEF DESCRIPTION OF THE DRAWINGS

Various features of the implementations can be more fully appreciated, as the same become better understood with reference to the following detailed description of the implementations when considered in connection with the accompanying figures, in which:

FIG. 3B illustrates an example of a write history, according to various implementations.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, many different types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Implementations of the present disclosure are directed to systems and methods for scheduling write requests that are to be sent to a solid state storage device. Because write requests can increase the apparent latency of a solid state storage device, an I/O scheduler can manage the number and the timing of write requests that are sent to the storage device in order to prevent the write requests from dominating a storage buffer of the storage device. In implementations, the I/O scheduler can monitor the number of write requests and read requests in the storage buffer of the storage device and maintain a balance between write requests and read requests. For example, if the storage buffer is holding an unacceptable number of write requests relative to a size of the storage buffer, the I/O scheduler can hold write requests until the storage device processes some of the write requests in the storage buffer. The I/O scheduler can also hold write requests if the storage buffer is holding an unacceptable number of write requests relative to a total number of requests (read and write) in the storage buffer. As a result, the I/O scheduler can maintain space in the storage buffer of the storage device for pending and future read requests, which are processed faster by the storage device.

In implementations, the I/O scheduler can also monitor the latency of the storage device in processing write requests and manage the write requests sent to the storage device based on the latency. Based on previous processing times, the I/O scheduler can determine the expected latency of the storage device. If the latency is at an unacceptable level, the I/O scheduler can hold write requests until the latency returns to an acceptable level. Accordingly, the I/O scheduler can prevent the apparent latency from reaching undesirable levels.

Figure 1:
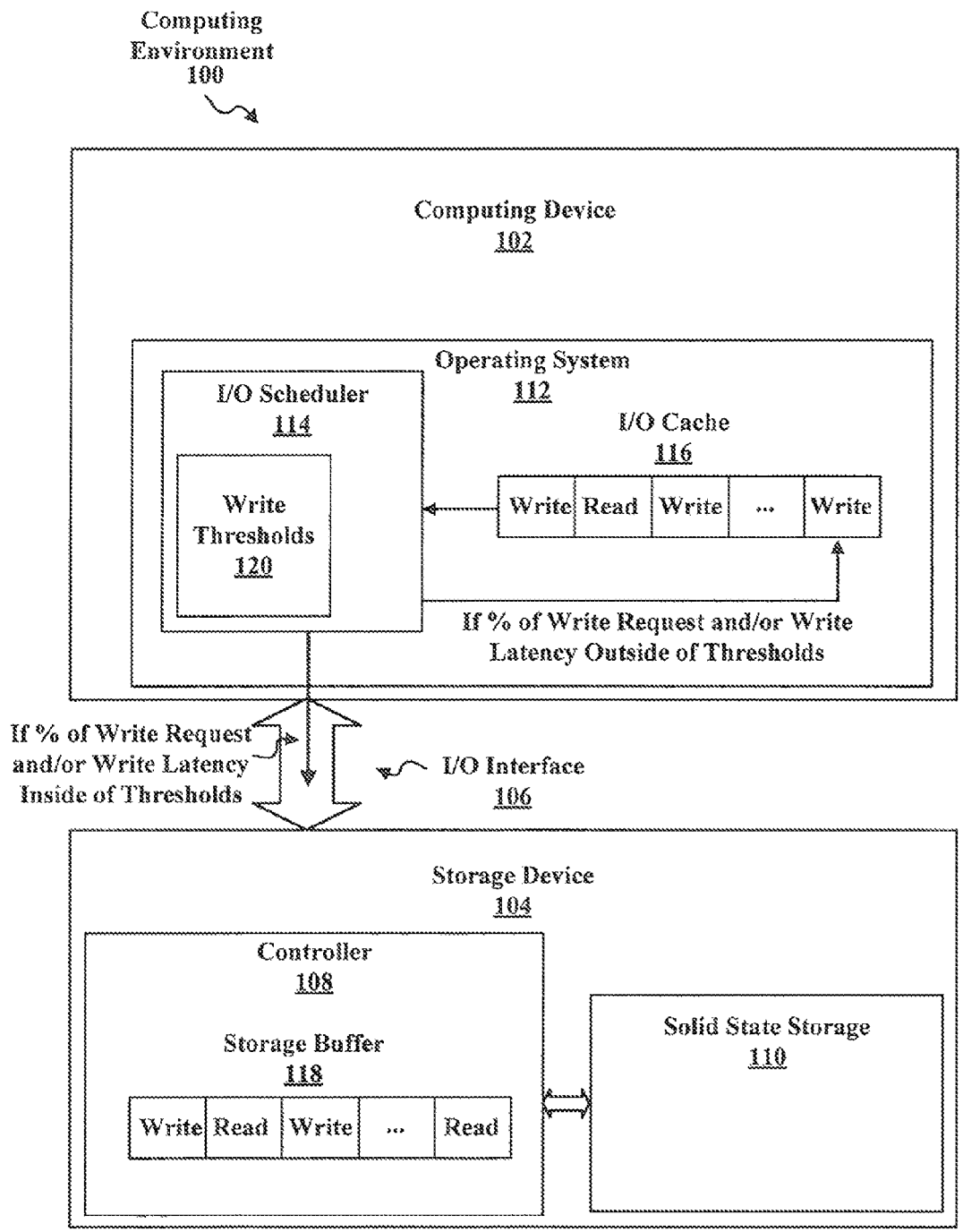
FIG. 1 illustrates an example of an environment in which write request scheduling can be performed, according to various implementations.

FIG. 1 illustrates an example of a computing environment 100 in which write request scheduling can be performed, according to various implementations. While FIG. 1 illustrates various components contained in the computing environment 100, FIG. 1 illustrates one example of a computing environment and additional components can be added and existing components can be removed.

As illustrated in FIG. 1, the computing environment 100 can include a computing device 102. The computing device 102 can be any type of conventional computing device. For example, the computing device 102 can be a desktop, laptop, server, etc., or mobile device, such as a smart telephone, tablet computer, cellular telephone, personal digital assistant, etc. The computing device 102 can include hardware resources, such as processors, memory, network hardware, storage devices, and the like, and software resources, such as operating systems (OSes), application programs, and the like.

The computing environment 100 can also include a storage device 104 that is coupled to the computing device 102. The storage device 104 can be coupled to the computing device 102 by an input/output (I/O) interface 106. The I/O interface 106 can be any type of conventional I/O interface. For example, the I/O interface 106 can be any type of conventional interface over which a computing device and a storage device can communicate and exchange data, such as small computer system interface (SCSI), serial ATA (SATA), serial-attached SCSI (ASA), Universal Serial Bus (USB), and the like. In implementations, the storage device 104 can be configured to store data for use by the computing device 102 or other devices and systems. The storage device 104 can be housed in the same enclosure with the computing device 102. Likewise, the storage device 104 can be housed in a separate enclosure and coupled to the computing device 102.

In implementations, the storage device 104 can include a controller 108 and solid state storage 110. The controller 108 can be configured to control and manage the storage and retrieval of data in the solid state storage 110. The controller 108 can include both hardware and software resources to control the operations of the storage device, such as communicating with the computing device 102 via the I/O interface 106, writing data to the solid state storage 110, reading data from the solid state storage 110, etc. The solid state storage 110 can include integrated circuit assemblies to persistently store data. For example, the solid state storage 110 can include flash memory and/or random access memory (RAM) that are configured to persistently store data.

The computing device 102 can include an operating system (OS) 112. The OS 112 can be any type of open-source or proprietary operating system. The OS 112 can include an I/O scheduler 114. While illustrated as being part of the OS 112, the I/O scheduler 114 (or any of the functionality of the I/O scheduler 114) can be implemented in any other software program, implemented as a stand-alone software program, implemented as a hardware component in the computing system 102, or combinations thereof. The I/O scheduler 114 can be configured to send I/O requests to the storage device 104. The I/O scheduler 114 can be configured to monitor an I/O cache 116 for I/O requests (e.g. read requests and write requests) intended for the storage device 104. The I/O cache 116 can be any type of data structure or data structures capable of storing I/O requests.

The storage device 104 can also include storage buffer 118. The storage buffer 118 can be configured to store I/O requests that are to be processed by the storage device 104. The storage buffer 118 can be any type of data structure or data structures capable of storing I/O requests. The controller 108 can be configured to read the I/O requests from the storage buffer and communicate with the solid state storage 110 to perform the I/O requests. The controller 108 can be configured to utilize any type of scheduling algorithm for determining the order with which to process the I/O requests.

As mentioned above, due to the longer processing time of write requests compared to read requests, the write requests can dominate the storage buffer 118 and increase the apparent latency of the storage device 104. In implementations, the I/O scheduler 114 can be configured to manage and schedule write requests that are sent to the storage device 104 in order to prevent the write requests from dominating the storage buffer 118. In particular, the I/O scheduler 114 can be configured to monitor the number of I/O requests in the storage buffer 118 and maintain a balance between write requests and read requests in the storage buffer 118. Likewise, the I/O scheduler 114 can be configured to monitor the latency of the storage device 104 in processing write requests and manage the write requests sent to the storage device 104 based on the latency.

In implementations, the I/O scheduler 114 can be configured to utilize one or more write thresholds 120. The write threshold 120 can represent acceptable levels of write requests in the storage buffer 118 and acceptable latency for write requests in order to maintain processing speed of the storage device 104. In operation, when the I/O scheduler 114 identifies a write request to be sent to the storage device, the I/O scheduler 114 can check the current level of write requests in the storage buffer 118 against the write thresholds 120. Likewise, the I/O scheduler 114 can check the latency of write requests against the write thresholds 120. Based on the checks, the I/O scheduler 114 can determine to hold the write request in the I/O cache 116 or send the write request to the storage device 104.

Figure 2A:
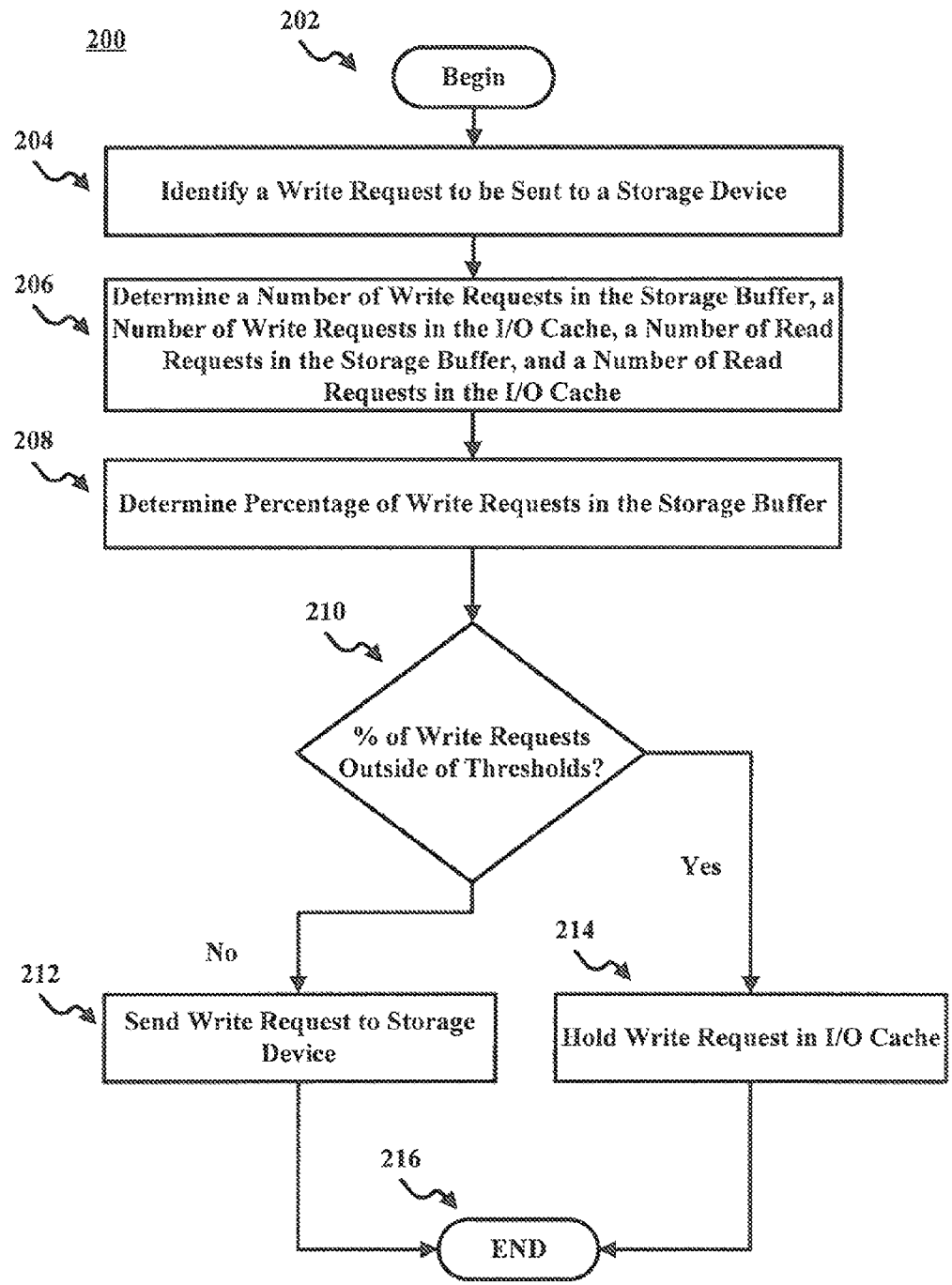
FIG. 2A illustrates an example of a process for scheduling write requests based on percentage of write requests in a storage buffer, according to various implementations.

FIG. 2A illustrates a process 200 for scheduling write requests based on the percentage of write requests pending in a storage device, according to various implementations. In the process 200, the illustrated stages are examples and any of the illustrated stages can be removed, additional stages can be added, and the order of the illustrated stages can be changed. Additionally, while the process 200 is described as being performed by the I/O scheduler 114, one or more of the stages of the process 200 can be performed by any hardware or software component of the computing device 102.

In 202, the process can begin. In 204, the I/O scheduler 114 can identify a write request to be sent to the storage device 104. For example, the I/O scheduler 114 can examine the I/O cache 116 and determine the next pending I/O request in the I/O cache 116. Based on the examination, the I/O scheduler 114 can determine that the next pending I/O request is a write request.

In 206, once the next pending I/O request is identified as a write request, the I/O scheduler 114 can determine the number of I/O requests in the I/O cache 116 and the storage buffer 118. For example, the I/O scheduler 114 can determine a number of write requests in the storage buffer 118, a number of write requests in the I/O cache 116, a number of read requests in the storage buffer 118, and a number of read requests in the I/O cache 116. For example, the I/O scheduler 114 can maintain a record of the number of write requests in the storage buffer 118, the number of write requests in the I/O cache 116, the number of read requests in the storage buffer 118, and the number of read requests in the I/O cache 116. While the I/O scheduler 114 can determine the number of all I/O requests in the I/O cache 116 and the storage buffer 118, the I/O scheduler 114 can alternatively be configured to only determine the number of I/O requests in the I/O cache 116 and the storage buffer 118 required for the process 200.

In 208, the I/O scheduler 114 can determine the percentage of write requests that are in the storage buffer 118. The I/O scheduler 114 can determine the percentage of write requests in the storage buffer based on the number of write requests in the storage buffer 118, the number of write requests in the I/O cache 116, the number of read requests in the storage buffer 118, and the number of read requests in the I/O Cache 116. For example, the percentage of write requests that are in the storage buffer 118 can be the percentage of write requests relative to the total number of I/O requests that are in the storage buffer 118. In this example, the percentage of write requests in the storage buffer 118 can be given by the equation:

$$\% \text{ of write request} = \frac{wr_{sb}}{wr_{sb} + rr_{sb}}$$

where $wr_{sb}$ is the number of write requests in the storage buffer 118 and $rr_{sb}$ is the number of read requests in the storage buffer 118.

Additionally, the percentage of write requests that are in the storage buffer 118 can be the percentage of write requests relative to the total number of I/O requests that can be held by the storage buffer 118. In this example, the percentage of write requests can be given by the equation:

$$\% \text{ of write request} = \frac{wr_{sb}}{\# \text{ of slots in storage buffer}}$$

where $wr_{sb}$ is the number of write requests in the storage buffer 118 and # of slots in the storage buffer is the total number of I/O requests that can be held by the storage buffer 118.

In 210, the I/O scheduler 114 can compare the percentage of write requests in the storage buffer 118 to one or more thresholds. The I/O scheduler 114 can access the write thresholds 120 and determine one or more thresholds to compare to the percentage of write requests. The I/O scheduler 114 can compare the percentage of write requests to the one or more thresholds to determine if the percentage of write requests is outside the one or more thresholds.

For example, the one or more thresholds can include a threshold for the allowed percentage of write requests among the available slots in the storage buffer 118. Likewise, for example, the one or more thresholds can include a threshold for the allowed percentage of write requests among the current I/O requests in the storage buffer 118.

In 212, if the I/O scheduler 114 determines that the percentage of write requests is within the one or more thresholds, the I/O scheduler 114 can send the write request to the storage device 104. The I/O scheduler 114 can send the write request to the storage device 104 via the I/O interface 106. Once received, the storage device 104 can place the write request in the storage buffer 118 for processing and storage in the solid state storage 110.

In 214, if the I/O scheduler 114 determines that the percentage of write requests is outside one or more thresholds, the I/O scheduler 114 can hold the write request in the I/O cache 116. As such, the write request can be examined at a later time to determine if the storage device 104 can handle additional write requests. For example, the I/O scheduler 114 can leave the write request at the first position in the I/O cache 116 and wait a time period before restarting the process 200 for the write request. Likewise, the I/O scheduler 114 can examine the I/O cache 116 for read requests and send one or more read requests to the storage device 104. Once one or more of the read requests are sent to the storage device 104, the I/O scheduler 114 can restart the process 200 for the write request.

In 216, the process can end, repeat, or return to any point.

While process 200 is described as utilizing percentage of write requests in the storage buffer, other metrics can be utilized in scheduling the sending of write requests to the storage device 104. For example, the I/O scheduler 114 can compare the number of write requests held by the storage buffer 118 to one or more threshold that represent an absolute number of allowed write requests to be held by the storage buffer 118.

Figure 2B:
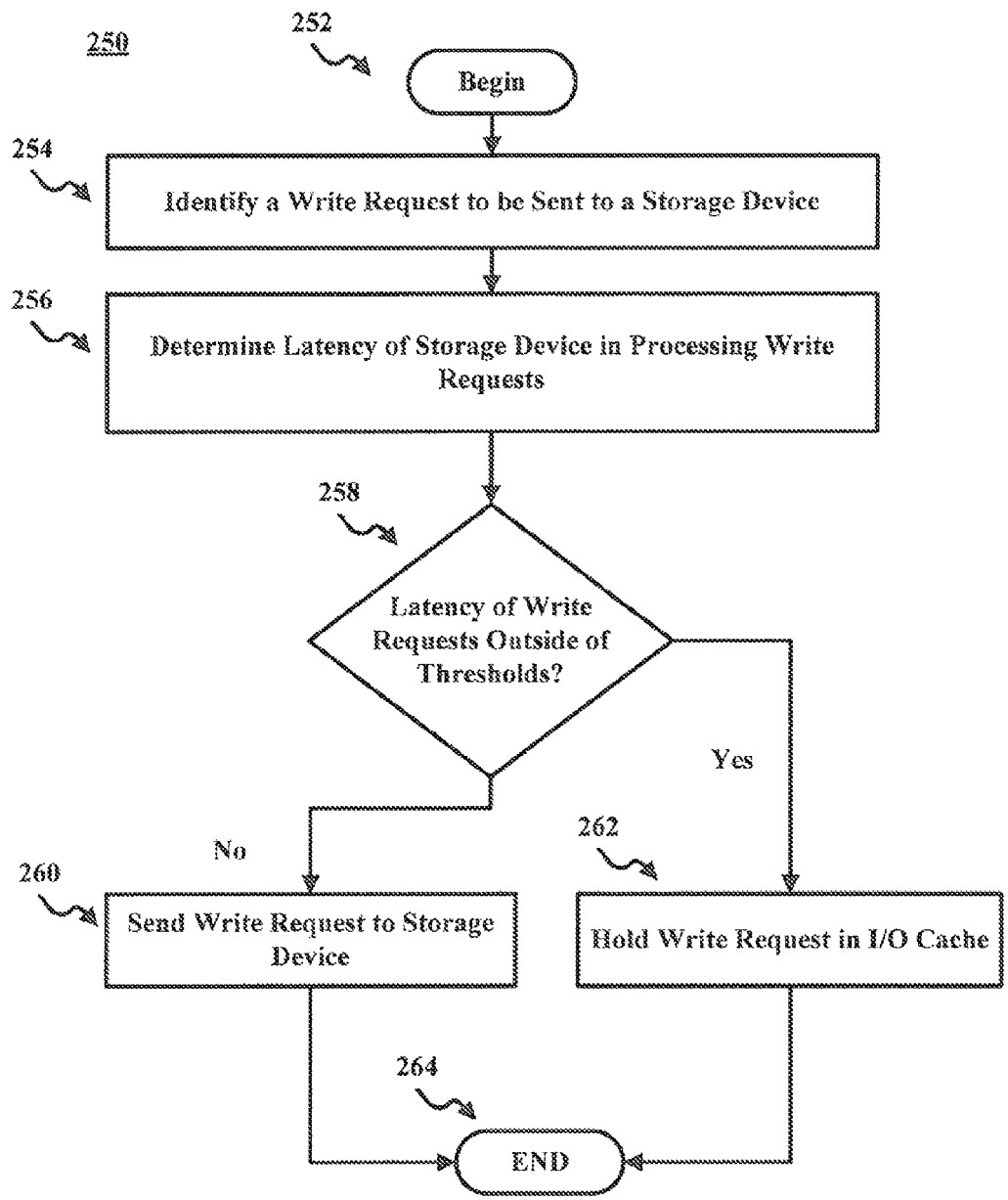
FIG. 2B illustrates an example of a process for scheduling write requests based on the latency of processing write requests by a storage device, according to various implementations.

FIG. 2B illustrates an example of a process 250 for scheduling write requests based on the latency of processing write requests by a storage device, according to various implementations. In process 250, the illustrated stages are examples and any of the illustrated stages can be removed, additional stages can be added, and the order of the illustrated stages can be changed. Additionally, while the process 250 is described as being performed by the I/O scheduler 114, one or more of the stages of the process 250 can be performed by any hardware or software component of the computing device 102.

In 252, the process can begin. In 254, the I/O scheduler 114 can identify a write request to be sent to the storage device 104. For example, the I/O scheduler 114 can examine the I/O cache 116 and determine the next pending I/O request in the I/O cache 116. Based on the examination, the I/O scheduler 114 can determine that the next pending I/O request is a write request.

In 256, the I/O scheduler 114 can determine a latency of the storage device 104 in processing write requests. For example, the I/O scheduler 114 can determine the times required by the storage device 104 to process one or more previous write requests. For instance, the I/O scheduler 114 can maintain a history of write requests that includes times when write requests were sent to the storage device 104 and times when the storage device 104 acknowledged that the write requests were processed. The processing time for a write request can be given by the difference in the time sent and time acknowledged. From the processing times, the I/O scheduler 114 can determine an expected latency of the storage device 104 in processing write requests.

To determine the expected latency, the I/O scheduler 114 can utilize a variety of mathematical and statistical processes. For example, the I/O scheduler 114 can determine that the expected latency is represented by one of the processing times of previous write requests. For instance, the I/O scheduler 114 can select one of the processing times of the previous write requests, e.g. most recently processed write request, as the expected latency.

In another example, the I/O scheduler 114 can determine the expected latency is represented by the mean latency of one or more previous write requests. The I/O scheduler 114 can determine the mean latency based on the equation:

$$\text{latency of write requests} = 1/n \sum_{i=1}^{n} (t_i)$$

wherein n is the number of write requests and $t_i$ is the time to process a write request. Likewise, for example, the I/O scheduler 114 can determine the expected latency is represented by the median latency of one or more previous write requests.

In determining the expected latency in the above examples, the I/O scheduler 114 can utilize any number of previously processed write requests. For example, the I/O scheduler 114 can utilize a number of write requests that occurred over a time period or time window. In this example, as more write requests are processed, the time period or time window can be shifted forward in time to include recently processed write requests.

Likewise, in determining the expected latency in the above examples, the I/O scheduler 114 can utilize various statistical processes to select the processing times of the one or more previously processed write requests. For example, the I/O scheduler 114 can utilize all the processing times within a time period or time window. Likewise, the I/O scheduler 114 can utilize certain processing times that fall within a range relative to each other. The I/O scheduler 114 can remove certain processing times that are not representative of the other processing times within a time period or time window. For instance, as a non-limiting example, in a set of processing times in a time window, the I/O scheduler 114 can remove processing times that fall below the $25^{th}$ percentile and above the $75^{th}$ percentile.

Likewise, for example, the I/O scheduler 114 can utilize mathematical or statistical processes that extrapolate a future processing time based on the past processing times of the write requests. The I/O scheduler 114 can determine that the extrapolated processing time is representative of the expected latency. For instance, the I/O scheduler 114 can examine the processing times for tends and extrapolate the future processing time based on the trends. Likewise, for instance, the I/O scheduler 114 can determine that the processing time is increasing or decreasing over time and extrapolate a future processing time by using curve fitting techniques.

While several examples are described above, the I/O scheduler 114 can utilize any mathematical and statistical process to determine an expected latency that is representative of the storage device 104 processing the write requests.

In 258, the I/O scheduler 114 can compare the latency of the storage device in processing write requests to one or more thresholds. The I/O scheduler 114 can access the write thresholds 120 and determine one or more thresholds to compare to the latency of the storage device in processing write requests. The I/O scheduler 114 can compare the latency of the storage device in processing write requests to the one or more thresholds to determine if the latency is outside the one or more thresholds.

In 260, if the I/O scheduler 114 determines that the latency of the storage device in processing write requests is within the one or more thresholds, the I/O scheduler 114 can send the write request to the storage device 104. The I/O scheduler 114 can send the write request to the storage device 104 via the I/O interface 106. Once received, the storage device 104 can place the write request in the storage buffer 118 for processing and storage in the solid state storage 110.

In 262, if the I/O scheduler 114 determines that the latency of the storage device in processing the write requests is outside one or more thresholds, the I/O scheduler 114 can hold the write request to the I/O cache 116. As such, the write request can be examine at a later time to determine if the storage device 104 can handle additional write requests. For example, the I/O scheduler 114 can leave the write request at the first position in the I/O cache 116 and wait a time period before restarting the process 200 for the write request. Likewise, the I/O scheduler 114 can examine the I/O cache 116 for read requests and send one or more read requests to the storage device 104. Once one or more of the read requests are sent to the storage device 104, the I/O scheduler 114 can restart the process 200 for the write request.

In 264, the process can end, repeat, or return to any point.

The processes 200 and 250 have been described above as separate processes. In implementations, both of the processes 200 and 250 can be performed on a particular write request to determine if the particular write request should be sent to the storage device 104 or returned to the I/O cache 116.

Figure 3A:
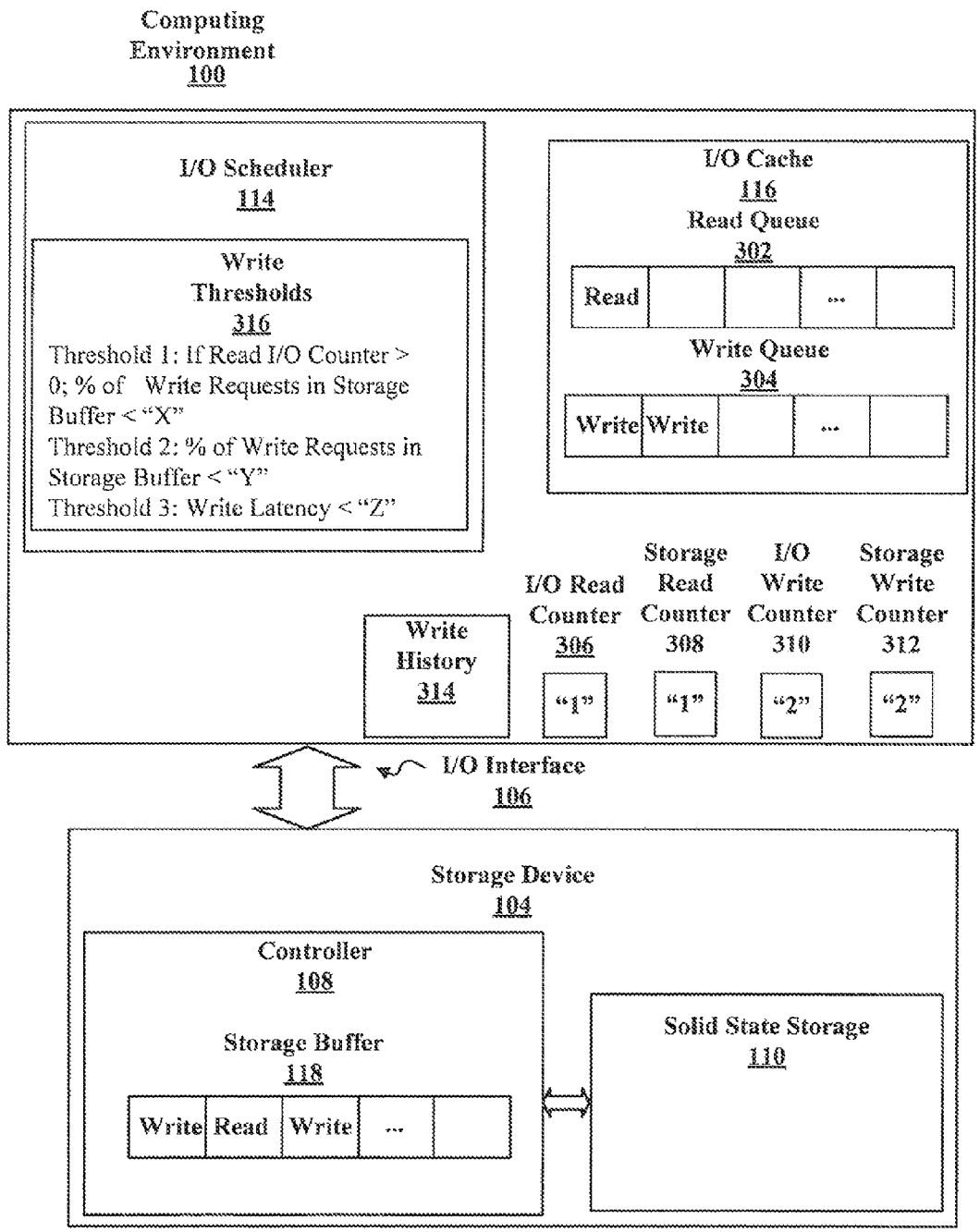
FIG. 3A illustrates another example of an environment in which write request scheduling can be performed, according to various implementations.

FIG. 3A illustrates another example of the computing environment 100 in which write request scheduling can be performed, according to various implementations. While FIG. 3A illustrates various components contained in the computing environment 100, FIG. 3A illustrates one example of a computing environment and additional components can be added and existing components can be removed.

As illustrated in FIG. 3A, the I/O cache 116 can include a read queue 302 and a write queue 304. The read queue 302 can be configured to hold the read requests intended for the storage device 104. The read queue 302 can be configured in a first in first out (FIFO) structure. The write queue 304 can be configured to hold the write requests intended for the storage device 104. The write queue 304 can be configured in a first in first out FIFO structure.

In implementations, the I/O scheduler 114 can be configured to maintain one or more counters in order to track the number of requests in the I/O cache 116 and the storage buffer 118. As illustrated, the I/O scheduler 114 can maintain an I/O read counter 306, a storage read counter 308, an I/O write counter 310, and a storage write counter 312. The I/O read counter 306 can be configured to track the number of read requests held by the read queue 302. In operation, when a read request is added to the read queue 302, the I/O scheduler 114 can increment the I/O read counter 306. When a read request is removed from the read queue 302 and sent to the storage device 104, the I/O scheduler 114 can decrement the I/O read counter 306. Likewise, the I/O write counter 310 can be configured to track the number of write requests held by the write queue 304. In operation, when a write request is added to the write queue 304, the I/O scheduler 114 can increment the I/O write counter 310. When a write request is removed from the write queue 304 and sent to the storage device 104, the I/O scheduler 114 can decrement the I/O write counter 310. While the above describes using counters to track the number of I/O requests in the I/O cache 116, the I/O scheduler 114 can utilize any type of data structure to track the number of I/O requests in the I/O cache 116.

The storage read counter 308 can be configured to track the number of read requests held by the storage buffer 118. In operation, when a read request is sent to the storage device 104, the I/O scheduler 114 can increment the storage read counter 308. When the I/O scheduler 114 receives an acknowledgment from the storage device 104 that a read request has been completed, the I/O scheduler 114 can decrement the storage read counter 308. Likewise, the storage write counter 312 can be configured to track the number of write requests held by the storage buffer 118. In operation, when a write request is sent to the storage device 104, the I/O scheduler 114 can increment the storage write counter 312. When the I/O scheduler 114 receives an acknowledgment from the storage device 104 that a write request has been completed, the I/O scheduler 114 can decrement the storage write counter 312. While the above describes using counters to track the number of I/O requests in the storage buffer 118, the I/O scheduler 114 can utilize any type of data structure to track the number of I/O requests in the storage buffer 118.

The I/O scheduler 114 can also maintain a write history 314. The I/O scheduler 114 can utilize the write history 314 to track the write requests sent to the storage device 104, the details of the write requests, and the details of the processing of the write requests by the storage device 104. The write history 314 can be implemented using any type of data structure.

FIG. 3B illustrates an example of the write history 314, according to various implementations. While FIG. 3B illustrates various data fields contained in the write history 314, FIG. 3B illustrates one example of a data structure for the write history 314 and additional data fields can be added and existing data fields can be removed.

As illustrated, the write history 314 can be configured as a table 350 that can store details of the write requests. Each row in the table 350 can correspond to a write request that has been sent to the storage device 104. The columns in the table can include data for each write request that has been sent to the storage device 104. For example, the first column can correspond to an identification of the write request. The second column can correspond to a time stamp of the time the write request was sent. The third column can correspond to a time stamp of the time an acknowledgment of the completion of the write request was received from the storage device 104.

In implementations, the I/O scheduler 114 can be configured to utilize one or more write thresholds 316. The write thresholds 316 can define thresholds of the number of write requests in the storage buffer 118 and thresholds for the latency of the storage device 104 in processing write requests. The write threshold 316 can represent acceptable levels of write requests in the storage buffer 118 and acceptable latency for write requests in order to maintain processing speed of the storage device 104. In operation, when the I/O scheduler 114 identifies a write requests to be sent to the storage device, the I/O scheduler 114 can check the current level of write requests in the storage buffer 118 against the write thresholds 316. Likewise, the I/O scheduler 114 can check the latency of write requests against the write thresholds 316. Based on the checks, the I/O scheduler 114 can determine to hold the write request in the I/O cache 116 or send the write request to the storage device 104.

In this example, the write threshold 316 can include three thresholds, Threshold 1, Threshold 2, and Threshold 3. Threshold 1 can represent the acceptable percentage of write requests, relative to total I/O requests in the storage buffer 118, when there are read requests waiting to be sent to the storage device 104. As such, the Threshold 1 can limit the number of write requests being sent to the storage device 104 when the read queue 302 has read requests that can be sent. Thus, the I/O scheduler 114 can prevent write requests from filling up the storage buffer 118 when read requests are available. Threshold 2 can represent the acceptable percentage of writes requests in the storage buffer 118 relative to the size storage buffer 118. By utilizing the Threshold 2, the I/O scheduler 114 can prevent the storage buffer 118 from filling with write requests, for example, a large number of write requests are identified without any read requests. Threshold 3 can represent the acceptable latency of the storage device 104 in processing write requests. Threshold 3 can be an amount of time, for example, milliseconds, representing the acceptable latency of the storage device 104 in processing write requests.

Figure 4A:
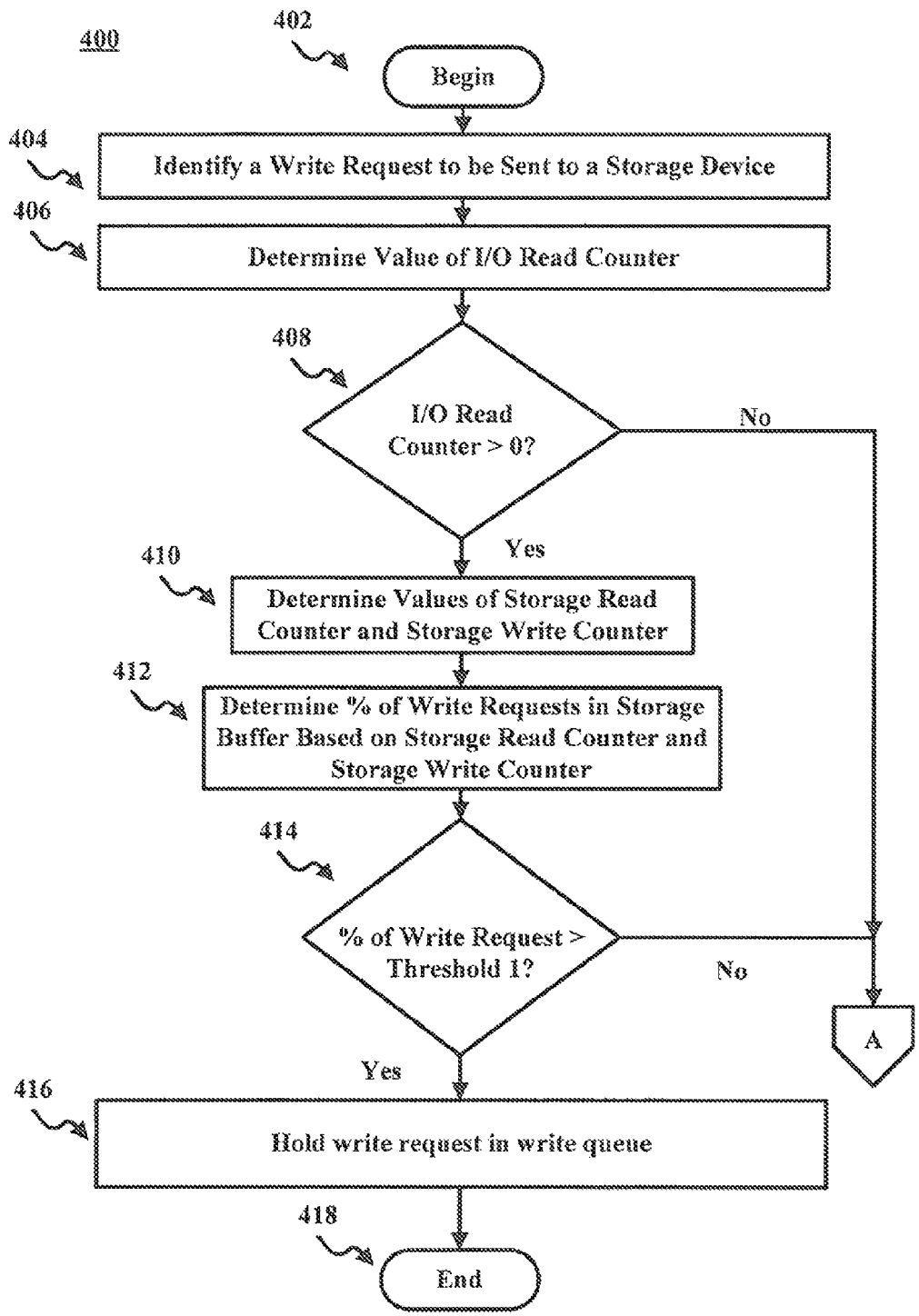
FIGS. 4A and 4B illustrate another example of a process for scheduling write requests based on the percentage of write requests in a storage buffer, according to various implementations.
Figure 4B:
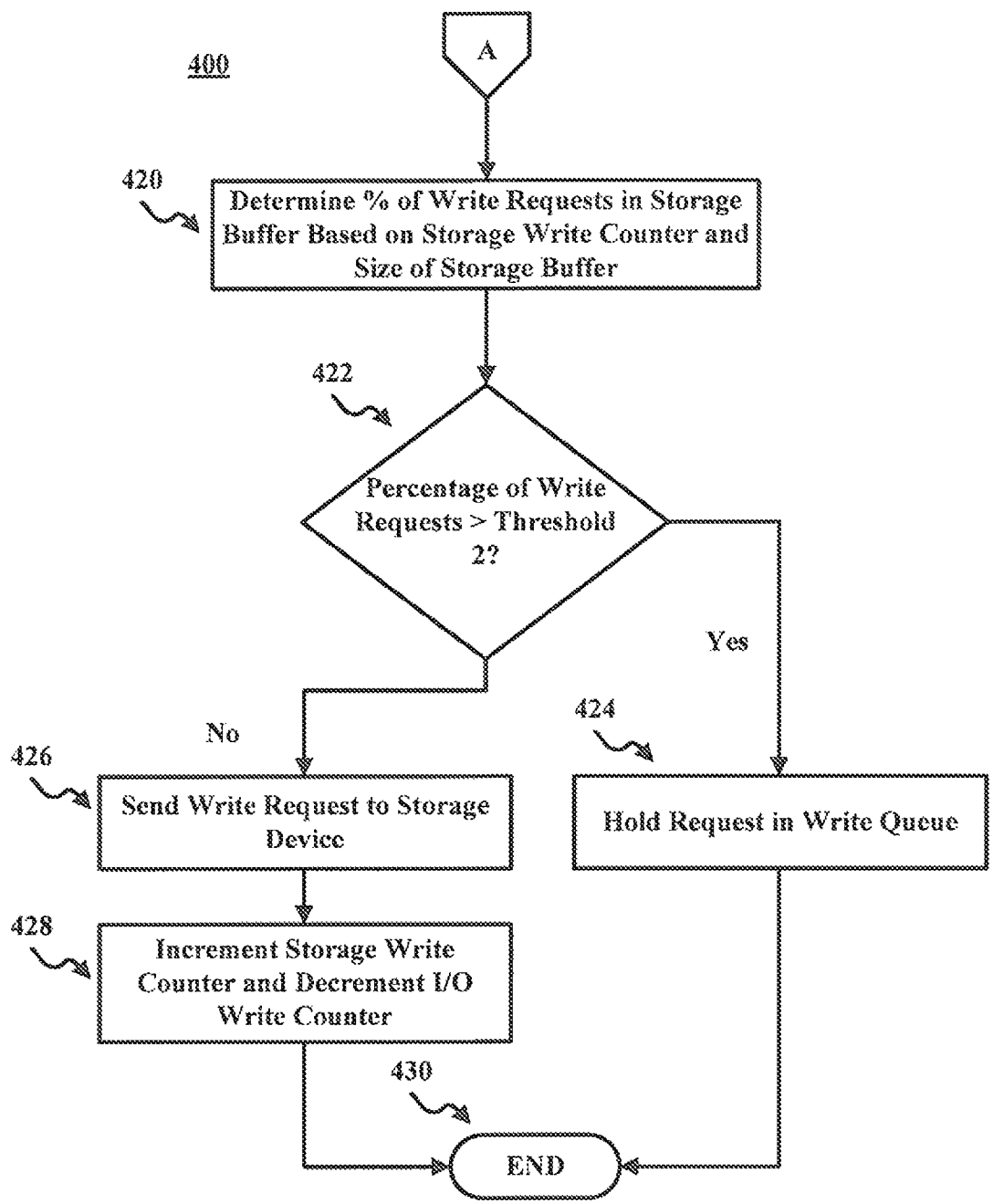

FIGS. 4A and 4B illustrate another process 400 for scheduling write requests based on the percentage of write requests pending in a storage device illustrated in FIG. 3A, according to various implementations. In the process 400, the illustrated stages are examples and any of the illustrated stages can be removed, additional stages can be added, and the order of the illustrated stages can be changed. Additionally, while the process 400 is described as being performed by the I/O scheduler 114, one or more of the stages of the process 400 can be performed by any hardware or software component of the computing device 102.

In 402, the process can begin. In 404, the I/O scheduler 114 can identify a write request to be sent to the storage device 104. For example, the I/O scheduler 114 can examine the I/O cache 116, in particular, the read queue 302 and the write queue 304, and determine the next pending I/O request in the I/O cache 116. Based on the examination, the I/O scheduler 114 can determine that the next pending I/O request is a write request.

In 406, once the next pending I/O request is identified as a write request, the I/O scheduler 114 can determine the value of the I/O read counter 306. The value of the I/O read counter 306 indicates the number of read requests being held by the read queue 302. In 408, the I/O scheduler 114 can determine if the value of the I/O read counter 306 is greater than "0." By determining the value of the I/O read counter 306 is not greater than "0," the I/O scheduler 114 can determine that the read queue 302 does not contain a read request waiting to be sent to the storage device. If the value of the I/O read counter 306 is not greater than "0," the I/O scheduler 114 can proceed to 420.

If the value of the I/O read counter 306 is greater than "0," the I/O scheduler 114 can proceed to 410. By determining that the value of the I/O read counter 306 is greater than "0," the I/O scheduler 114 can determine that the read queue 302 contains a read request waiting to be sent to the storage device. In 410-414, the I/O scheduler 114 can apply Threshold 1 which defines the acceptable percentage of write requests in the storage buffer 118 relative to the total number of I/O requests in the storage buffer 118.

In 410, the I/O scheduler 114 can determine the values of the storage read counter 308 and the storage write counter 312. The value of the storage read counter 308 indicates the number of read requests being held by the storage buffer 118. The value of the storage write counter indicates the number of write requests being held by the storage buffer 118.

In 412, the I/O scheduler 114 can determine the percentage of write requests relative to the total number of I/O requests that are in the storage buffer 118. The I/O scheduler 114 can determine the percentage of write requests in the storage buffer based on the number of write requests in the storage buffer 118 and the number of read requests in the storage buffer 118. The percentage of write requests in the storage buffer 118 can be given by the equation:

$$\% \text{ of write request} = \frac{WCount_{sb}}{WCount_{sb} + RCount_{sb}}$$

where $WCount_{sb}$ is the value of the storage write counter 312 and $RCount_{sb}$ is the value of the storage read counter 308.

In 414, the I/O scheduler 114 can determine if the percentage of write requests is greater then Threshold 1. Threshold 1 can represent the maximum desirable percentage of write requests, relative to total I/O requests in the storage buffer 118, when there are read requests waiting to be sent to the storage device 104. As such, the Threshold 1 can limit the number of write requests being sent to the storage device 104 when the read queue 302 has read requests that can be sent. Thus, the I/O scheduler 114 can prevent write requests from filling up the storage buffer 118 when read requests are available.

If the percentage of write requests is greater than Threshold 1, the I/O scheduler 114 can hold the write request to the write queue 304, as shown at 416. As such, the write request can be examined at a later time to determine if the storage device 104 can handle additional write requests. For example, the I/O scheduler 114 can leave the write request at the first position in the write queue 304 and wait a time period before restarting the process 400 for the write request. Likewise, the I/O scheduler 114 can examine the read queue 302 for read requests and send one or more read requests to the storage device 104. Once one or more of the read requests are sent to the storage device 104, the I/O scheduler 114 can restart the process 400 for the write request. In 418, the process can end, repeat, or return to any point.

If the percentage of write requests is less than or equal to Threshold 1, the I/O scheduler 114 can proceed to 420 (illustrated in FIG. 4B). In 420-430, the I/O scheduler 114 can apply Threshold 2 which defines the acceptable percentage of writes requests in the storage buffer 118 relative to the size storage buffer 118. By utilizing the Threshold 2, the I/O scheduler 114 can prevent the storage buffer 118 from filling with write requests, for example, a large number of write requests are identified without any read requests.

In 420, the I/O scheduler 114 can determine the percentage of write requests in the storage buffer 118 relative to the size of the storage buffer 118. Additionally, the size of the storage buffer 118 can be the total number of I/O requests that can be held by the storage buffer 118. The percentage of write requests can be given by the equation:

$$\% \text{ of write request} = \frac{WCount_{sb}}{\# \text{ of slots in storage buffer}}$$

where $WCount_{sb}$ is the number of write requests in the storage buffer 118 and # of slots in the storage buffer is the total number of I/O requests that can be held by the storage buffer 118.

In 422, the I/O scheduler 114 can compare the percentage of write requests in the storage buffer 118 to Threshold 2. In 424, if the percentage of write requests is greater than Threshold 2, the I/O scheduler 114 can hold the write request to the write queue 304. As such, the write request can be examined at a later time to determine if the storage device 104 can handle additional write requests. For example, the I/O scheduler 114 can leave the write request at the first position in the write queue 304 and wait a time period before restarting the process 400 for the write request. Likewise, the I/O scheduler 114 can examine the read queue 302 for read requests and send one or more read requests to the storage device 104.

In 426, if the I/O scheduler 114 determines that the percentage of write requests is less than or equal to Threshold 2, the I/O scheduler 114 can send the write request to the storage device 104. The I/O scheduler 114 can send the write request to the storage device 104 via the I/O interface 106. Once received, the storage device 104 can place the write request in the storage buffer 118 for processing and storage in the solid state storage 110.

In 428, the I/O scheduler 114 can increment the storage write counter 312 and can decrement the I/O write counter 310. As such, the I/O scheduler 114 can maintain an accurate count of the I/O requests in the I/O cache 116 and the storage buffer 118.

In 430, the process can end, repeat, or return to any point.

Figure 5A:
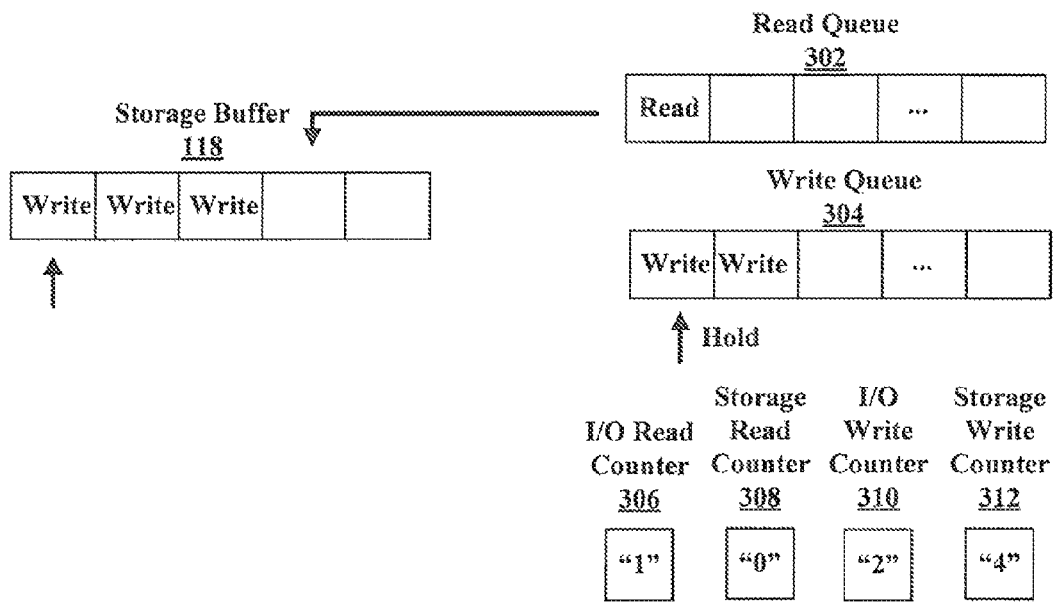
FIGS. 5A-5C illustrate examples of the process of FIGS. 4A and 4B being performed on examples of a read queue, a write queue, and a storage buffer, according to various implementations.
Figure 5B:
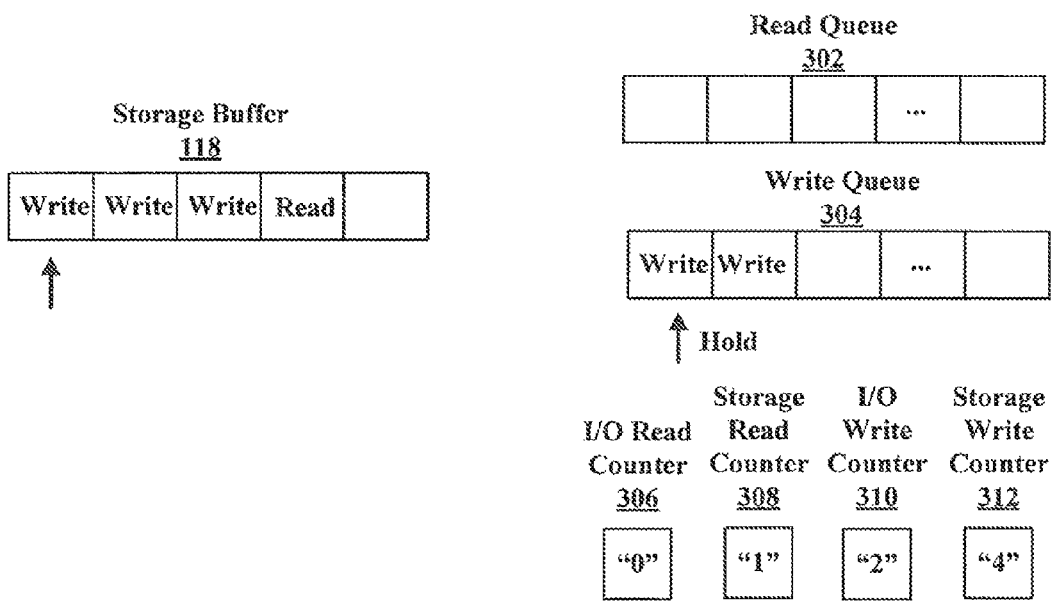
Figure 5C:
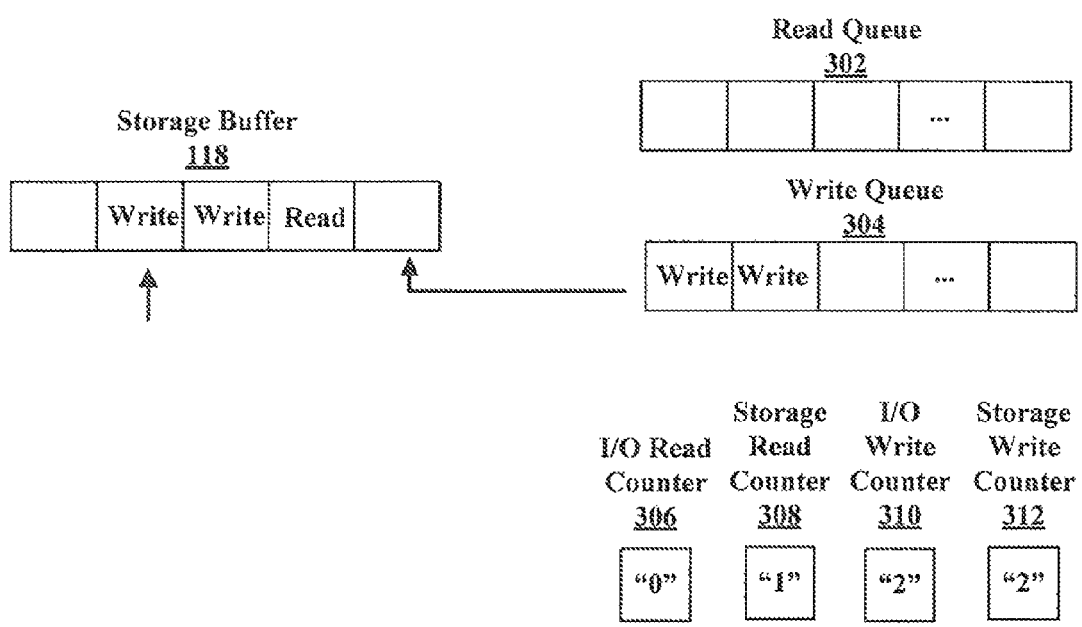

FIGS. 5A-5C illustrate an example of the process 400 being performed on an example of the storage buffer 118, the read queue 302, and the write queue 304. While FIGS. 5A-5C illustrate an example of the storage buffer 118, the read queue 302, and the write queue 304, the storage buffer 118, the read queue 302, and the write queue 304 can be configured in any structure and size.

As illustrated in 5A, the storage buffer 118 can be holding 3 write requests, the read queue 302 can be holding 1 read request, and the write queue 304 can be holding 2 write requests, which are reflected in the I/O read counter 306, the storage read counter 308, the I/O write counter 310, and the storage write 312. In this example, the Threshold 1 can be 30% and the Threshold 2 can be 50%.

The I/O scheduler 114 can begin the process 400 and identify that the write queue 304 is holding a write request to be sent to the storage device 104. Then, the I/O scheduler 114 can read the I/O read counter 306 and determine that the read queue 302 is holding a read request. Then, the I/O scheduler 114 can determine the percentage of write requests relative to the total number of I/O requests that are in the storage buffer 118 based on the values stored in the storage read counter 308 and the storage write 312. In this example, the I/O scheduler 114 can determine that the percentage is 100% (i.e., only write requests in the storage buffer 118.) The I/O scheduler 114 can then compare this percentage to the Threshold 1 and determine that the write request should be held in the write queue 304. Because the write request is being held, the I/O scheduler can send the read request to the storage device 104. The I/O scheduler 114 can also update the I/O read counter 306 and the storage read counter 308.

As illustrated in FIG. 5B, the I/O scheduler can restart the process 400 to determine if the write request can be sent to the storage device 104. In this example, the I/O scheduler can determine that the read queue 302 is not holding any read requests. Accordingly, the I/O scheduler 114 can determine the percentage of write requests relative to the size of the storage buffer 118 based on the values stored in the storage write 312. In this example, the I/O scheduler 114 can determine that the percentage is 60%. The I/O scheduler 114 can then compare this percentage to the Threshold 2 and determine that the write request should be held in the write queue 304.

As illustrated in FIG. 5C, the I/O scheduler can restart the process 400 to determine if the write request can be sent to the storage device 104. Since the last execution of process 400, the storage device completed one of the write requests in the storage buffer 118. In this example, the I/O scheduler can determine that the read queue 302 is not holding any read requests. Accordingly, the I/O scheduler 114 can determine the percentage of write requests relative to the size of the storage buffer 118 based on the values stored in the storage write 312. In this example, the I/O scheduler 114 can determine that the percentage is 40%. The I/O scheduler 114 can then compare this percentage to the Threshold 2 and determine that the write request can be sent to the storage device 104. The I/O scheduler 114 can also update the I/O write counter 310 and the storage write counter 312.

Figure 6:
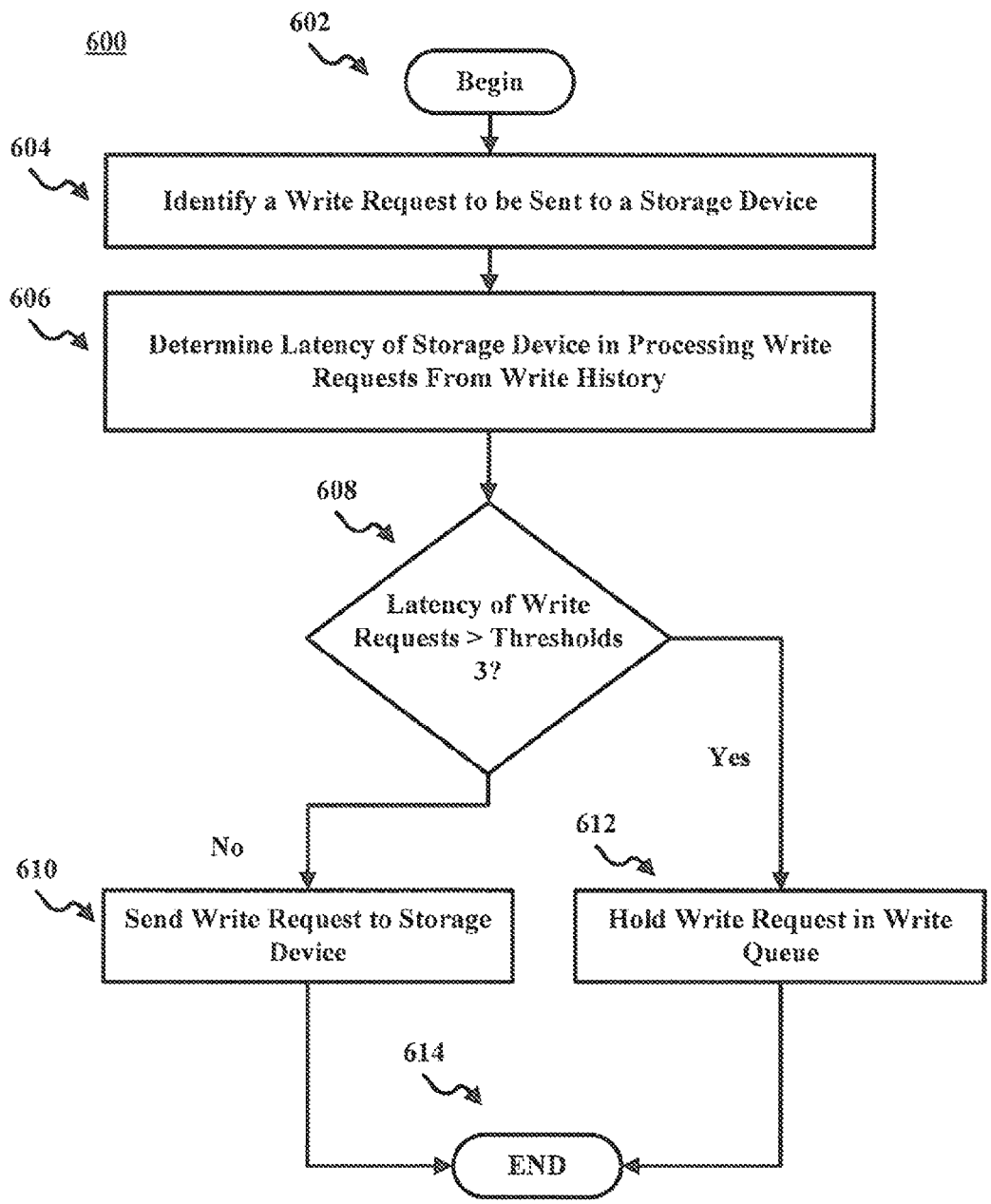
FIG. 6 illustrates another example of a process for scheduling write requests based on the latency of processing write requests by a storage device, according to various implementations.

FIG. 6 illustrates an example of a process 600 for scheduling write requests based on the latency of processing write requests by a storage device illustrated in FIG. 3A, according to various implementations. In process 600, the illustrated stages are examples and any of the illustrated stages can be removed, additional stages can be added, and the order of the illustrated stages can be changed. Additionally, while the process 600 is described as being performed by the I/O scheduler 114, one or more of the stages of the process 600 can be performed by any hardware or software component of the computing device 100.

In 602, the process can begin. In 604, the I/O scheduler 114 can identify a write request to be sent to the storage device 104. For example, the I/O scheduler 114 can examine the I/O cache 116, in particular, the read queue 302 and the write queue 304, and determine the next pending I/O request in the I/O cache 116. Based on the examination, the I/O scheduler 114 can determine that the next pending I/O request is a write request.

In 606, once the next pending request is identified as a write request, the I/O scheduler 114 can determine the latency of the storage device 104 in processing write requests from the write history 314. For example, the I/O scheduler 114 can determine the times required by the storage device 104 to process one or more previous write requests. For instance, the I/O scheduler 114 can extract, from the write history 314, the times when write requests were sent to the storage device 104 and the times when the storage device 104 acknowledged that the write requests were processed. The processing time for a write request can be given by the difference in the time sent and time acknowledged. From the processing times, the I/O scheduler 114 can determine an expected latency of the storage device 104 in processing write requests.

To determine the expected latency, the I/O scheduler 114 can utilize a variety of mathematical and statistical processes. For example, the I/O scheduler 114 can determine that the expected latency is represented by one of the processing times of previous write requests. For instance, the I/O scheduler 114 can select one of the processing times of the previous write requests, e.g. most recently processed write request, as the expected latency.

In another example, the I/O scheduler 114 can determine the expected latency is represented by the mean latency of one or more previous write requests. The I/O scheduler 114 can determine the mean latency based on the equation:

$$\text{latency of write requests} = 1/n \Sigma_{i=1}^{n}(t_i)$$

wherein n is the number of write requests and $t_i$ is the time to process a write request. Likewise, for example, the I/O scheduler 114 can determine the expected latency is represented by the median latency of one or more previous write requests.

In determining the expected latency in the above examples, the I/O scheduler 114 can utilize any number of previously processed write requests. For example, the I/O scheduler 114 can utilize a number of write requests that occurred over a time period or time window. In this example, as more write requests are processed, the time period or time window can be shifted forward in time to include recently processed write requests.

Likewise, in determining the expected latency in the above examples, the I/O scheduler 114 can utilize various statistical processes to select the processing times of the one or more previously processed write requests. For example, the I/O scheduler 114 can utilize all the processing times within a time period or time window. Likewise, the I/O scheduler 114 can utilize certain processing times that fall within a range relative to each other. The I/O scheduler 114 can remove certain processing times that are not representative of the other processing times within a time period or time window. For instance, as a non-limiting example, in a set of processing times in a time window, the I/O scheduler 114 can remove processing times that fall below the $25^{th}$ percentile and above the $75^{th}$ percentile.

Likewise, for example, the I/O scheduler 114 can utilize mathematical or statistical processes that extrapolate a future processing time based on the past processing times of the write requests. The I/O scheduler 114 can determine that the extrapolated processing time is representative of the expected latency. For instance, the I/O scheduler 114 can examine the processing times for tends and extrapolate the future processing time based on the trends. Likewise, for instance, the I/O scheduler 114 can determine that the processing time is increasing or decreasing over time and extrapolate a future processing time by using curve fitting techniques.

While several examples are described above, the I/O scheduler 114 can utilize any mathematical and statistical process to determine an expected latency that is representative of the storage device 104 processing the write requests.

In 608, the I/O scheduler 114 can compare the latency of the storage device in processing write requests to Threshold 3. The I/O scheduler 114 can access the write thresholds 316 and determine the value for Threshold 3.

In 608, if the I/O scheduler 114 determines that the latency of the storage device in processing write requests is less than or equal to Threshold 3, the I/O scheduler 114 can send the write request to the storage device 104, as shown at 610. The I/O scheduler 114 can send the write request to the storage device 104 via the I/O interface 106. Once received, the storage device 104 can place the write request in the storage buffer 118 for processing and storage in the solid state storage 110.

In 608, if the I/O scheduler 114 determines that the latency of the storage device in processing the write requests is greater than Threshold 3, the I/O scheduler 114 can hold the write request in the write queue 304, as shown at 612. As such, the write request can be examined at a later time to determine if the storage device 104 can handle additional write requests. For example, the I/O scheduler 114 can leave the write request at the first position in the write queue 304 and wait a time period before restarting the process 600 for the write request. Likewise, the I/O scheduler 114 can examine the read queue 302 for read requests and send one or more read requests to the storage device 104.

In 614, the process can end, repeat, or return to any point.

The processes 400 and 600 have been described above as separate processes. In implementations, both the processes 400 and 600 can be performed on a particular write request to determine if the particular write request should be sent to the storage device 104 or returned to the I/O cache 116.

Figure 7:
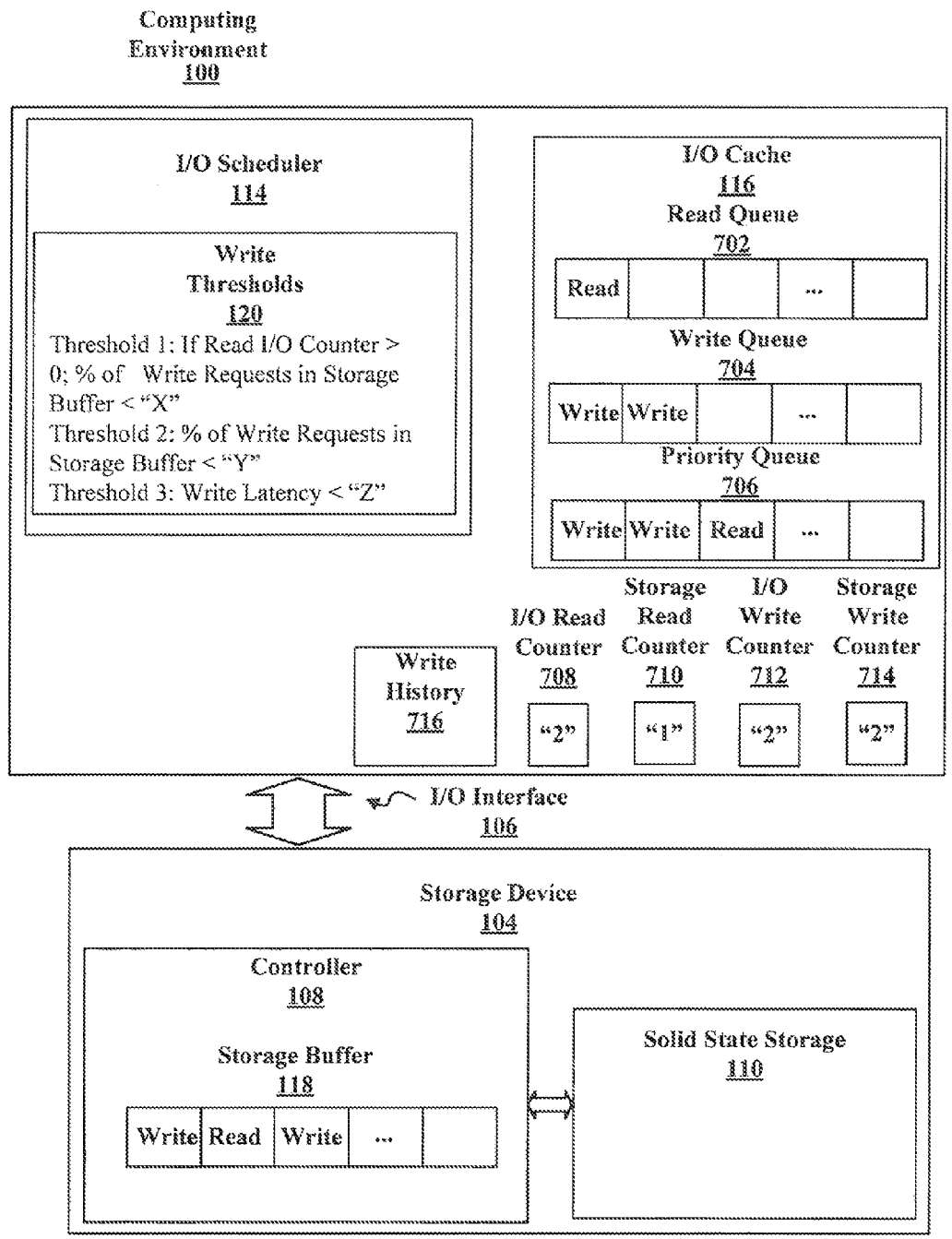
FIG. 7 illustrates another example of an environment in which write request scheduling can be performed, according to various implementations.

FIG. 7 illustrates another example of the computing environment 100 in which write request scheduling can be performed, according to various implementations. While FIG. 7 illustrates various components contained in the computing environment 100, FIG. 7 illustrates one example of a computing environment and additional components can be added and existing components can be removed.

As illustrated in FIG. 7, the I/O cache 116 can include a read queue 702 and a write queue 704. The read queue 702 can be configured to hold the read requests intended for the storage device 104. The read queue 702 can be configured in FIFO structure. The write queue 704 can be configured to hold the write requests intended for the storage device 104. The write queue 704 can be configured in FIFO structure.

The I/O cache 116 can also include a priority queue 706. The priority queue 706 can be configured hold I/O requests that have a higher priority than I/O requests in the read queue 702 and write queue 704. For example, one or more software programs implemented on the computing device 102 can have a higher priority then other software programs implemented on the computing device 102. Accordingly, the I/O requests of the higher priority software programs can take precedence over other I/O requests. The priority queue 706 can be configured in a FIFO structure.

In implementations, the I/O scheduler 114 can be configured to maintain one or more counters in order to track the number of requests in the I/O cache 116 and the storage buffer 118. As illustrated, the I/O scheduler 114 can maintain an I/O read counter 708, a storage read counter 710, an I/O write counter 712, and a storage write counter 714. The I/O read counter 708 can be configured to track the number of read requests held by the read queue 702. In operation, when a read request is added to the read queue 702, the I/O scheduler 114 can increment the I/O read counter 708. When a read request is removed from the read queue 702 and sent to the storage device 104, the I/O scheduler 114 can decrement the I/O read counter 708. Likewise, the I/O write counter 712 can be configured to track the number of write requests held by the write queue 704. In operation, when a write request is added to the write queue 704, the I/O scheduler 114 can increment the I/O write counter 712. When a write request is removed from the write queue 704 and sent to the storage device 104, the I/O scheduler 114 can decrement the I/O write counter 712.

The storage read counter 710 can be configured to track the number of read requests held by the storage buffer 118. In operation, when a read request is sent to the storage device 104, the I/O scheduler 114 can increment the storage read counter 710. When the I/O scheduler 114 receives an acknowledgment from the storage device 104 that a read request has been completed, the I/O scheduler 114 can decrement the storage read counter 710. Likewise, the storage write counter 714 can be configured to track the number of write requests held by the storage buffer 118. In operation, when a write request is sent to the storage device 104, the I/O scheduler 114 can increment the storage write counter 714. When the I/O scheduler 114 receives an acknowledgment from the storage device 104 that a write request has been completed, the I/O scheduler 114 can decrement the storage write counter 714.

The I/O scheduler 114 can also maintain a write history 716. The I/O scheduler 114 can utilize the write history 716 to track the write requests send to the storage device 104, the details of the write requests, and the details of the processing of the write requests by the storage device 104. The write history 716 can be implemented using any type of data structure.

In implementations, the I/O scheduler 114 can be configured to process the I/O requests in the priority queue 706 without applying the processes described above. That is, when an I/O request arrives in the priority queue 706, the I/O scheduler 114 can send the I/O request to the storage device without applying the write thresholds 120. In this example, the I/O read counter 708 and the I/O write counter 712 can reflect the I/O requests in the read queue 702 and the write queue 704. Alternatively, in some implementations, the I/O scheduler 114 can be configured to process the I/O requests in the priority queue 706 by applying the processes described above. In this example, the I/O read counter 708 and the I/O write counter 712 can reflect the I/O requests in the read queue 702, the write queue 704, and the priority queue 706.

In implementations, the I/O scheduler 114 can be configured to utilize the priority queue 706 to prioritize write requests held in the write queue 704 and read requests held in the read queue 702. For example, the I/O scheduler 114 can maintain a deadline for sending read requests and write requests to the storage device 104. The deadline can represent a limit on an amount of time a read request or a write request should be held in the I/O cache 116 before sending to the storage device 104. Once a particular read request or a particular write request has reached the deadline, the I/O scheduler 114 can move the particular read request or the particular write request to the priority queue 706. Once moved to the priority queue, the I/O scheduler 114 can process the particular read request or the particular write request at a higher priority than other requests in the read queue 702 or the write queue 704.

Figure 8:
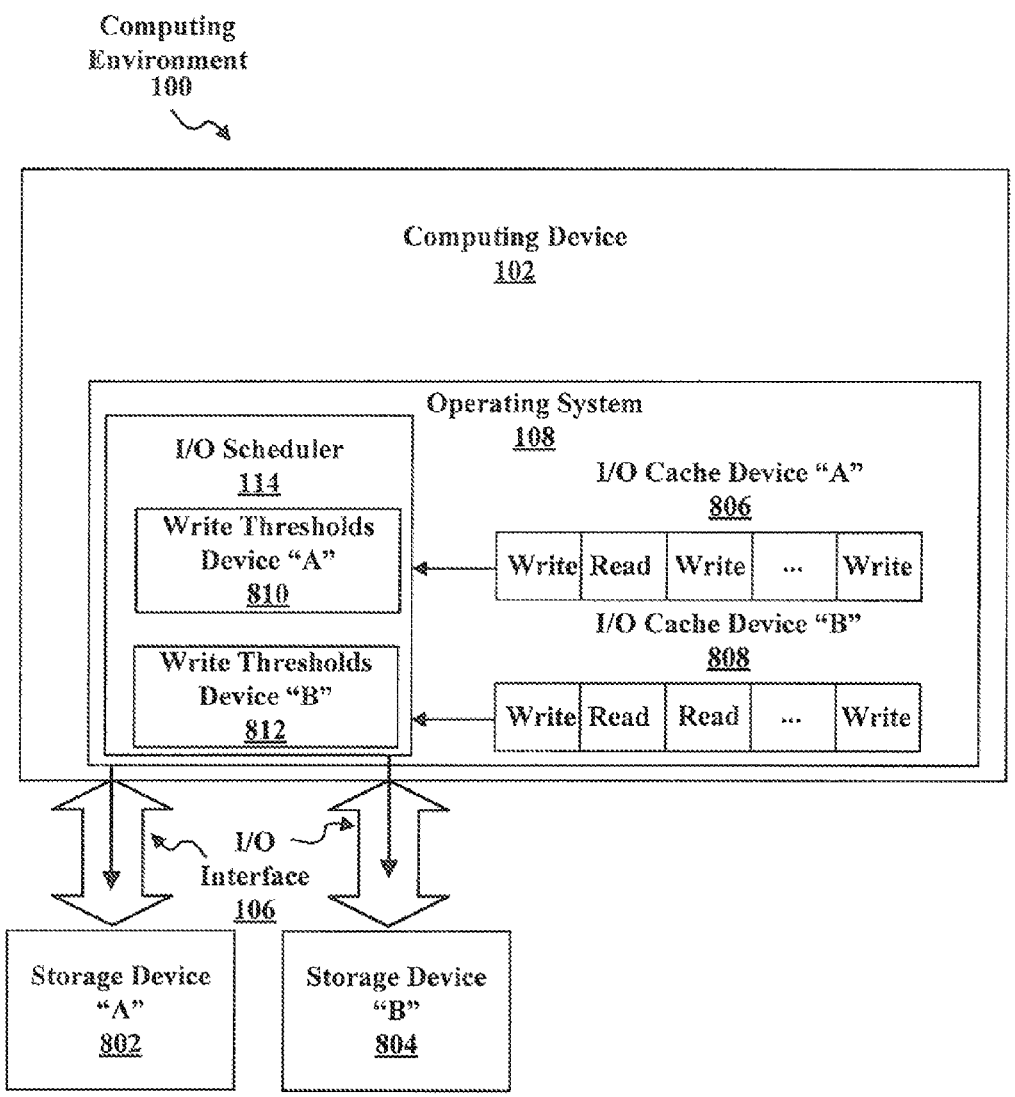
FIG. 8 illustrates another example of an environment in which write request scheduling can be performed, according to various implementations.

FIG. 8 illustrates another example of the computing environment 100 in which write request scheduling can be performed, according to various implementations. While FIG. 8 illustrates various components contained in the computing environment 100, FIG. 8 illustrates one example of a computing environment and additional components can be added and existing components can be removed.

As illustrated in FIG. 8, two storage device, storage device "A" 802 and storage device "B" 804 can be coupled to the computing device 102 via the I/O interface 106. As discussed above, the storage device "A" 802 and storage device "B" 804 can each include a controller and solid state storage. The controller for each storage device can be configured to control and manage the storage of data to the solid state storage in each. The controller for each storage device can include both hardware and software resources to control the operation of the storage device such as communicating with the computing device 102 via the I/O interface 106, writing data to the solid state storage, reading data from the solid state storage, etc. The solid state storage for each storage device can include integrated circuit assemblies to persistently store data. For example, the solid state storage for each device can include flash memory and/or RAM that are configured to persistently store data.

In implementations, the I/O scheduler 114 can maintain an I/O cache for each of the storage device "A" 802 and the storage device "B" 804. An I/O cache 806 can be configured to hold I/O requests intended for the storage device "A" 802. An I/O cache 808 can be configured to hold I/O requests intended for the storage device "B" 804. The I/O cache 806 and the I/O cache 808 can be any type of data structure or data structures capable of storing I/O requests. For example, the I/O cache 806 and the I/O cache 808 can be configured as described above in the various examples of the computing environment 100. While the I/O scheduler 114 can maintain separate I/O caches for the storage device "A" 802 and the storage device "B" 804, the I/O scheduler 114 can maintain a single I/O cache for the storage device "A" 802 and the storage device "B" 804.

In implementations, the I/O scheduler 114 can maintain write thresholds for each of the storage device "A" 802 and the storage device "B" 804. The I/O scheduler 114 can maintain a write thresholds device "A" 810. When performing any of the processes described above for the storage device "A" 802, the I/O scheduler 114 can utilize the write thresholds device "A" 810. The I/O scheduler 114 can maintain a write thresholds device "B" 812. When performing any of the processes described above for the storage device "B" 804, the I/O scheduler 114 can utilize the write thresholds device "B" 812. While the I/O scheduler 114 can maintain separate write thresholds for the storage device "A" 802 and the storage device "B" 804, the I/O scheduler 114 can maintain a single write thresholds for the storage device "A" 802 and the storage device "B" 804.

In the implementations described above, the write thresholds 120 can be preconfigured in the I/O scheduler 114. For example, the write thresholds 120 can be determined and preconfigured in the I/O scheduler 114 based on known write levels and latency for different storage devices. Likewise, the implementations described above, the write thresholds 120 can be altered or set by a user of the computing device 102.

In the implementations described above, the write thresholds 120 can be dynamically altered during and/or after the operations of the process described above. For example, the I/O scheduler 114 can set an initially value for a write threshold. Over time, the I/O scheduler 114 can increase the value of the write threshold. As write requests are processed by the storage device 104 under the increased threshold, the I/O scheduler 114 can monitor the latency of the storage device in processing the write requests. If the latency remains at an acceptable level, the I/O scheduler 114 can continue to increase the value of the write threshold. If the latency reaches an unacceptable level, the I/O scheduler 114 can decrease the value of the write threshold to a previous level.

Figure 9:
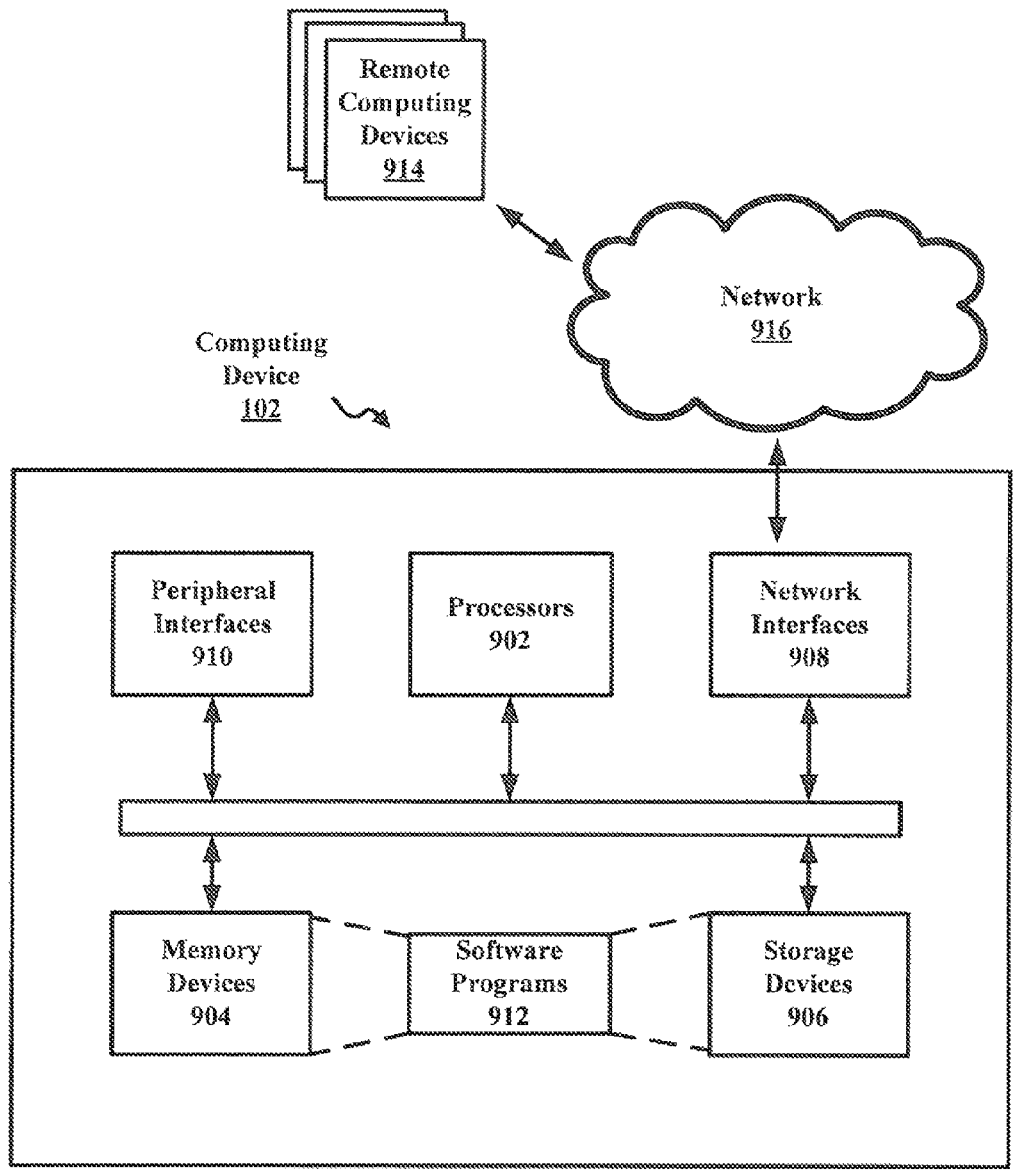
FIG. 9 illustrates another example of an environment in which write request scheduling can be performed, according to various implementations.

FIG. 9 illustrates an example of a hardware configuration for a computing device 102 implementing the I/O scheduler 114 that can be used to perform one or more of the processes described above. While FIG. 9 illustrates various components contained in the computing device 102, FIG. 9 illustrates one example of a computing device and additional components can be added and existing components can be removed.

As illustrated in FIG. 9, the computing device 102 can include one or more processors 902 of varying core configurations and clock frequencies. The computing device 102 can also include one or more memory devices 904 that serve as a main memory during the operation of the computing device 102. For example, during operation, a copy of the OS 112 and the I/O scheduler 114 can be stored in the one or more memory devices 904. Additionally, during operation, the I/O cache 116 can be implemented in the one or more memory devices 904. The computing device 102 can also include one or more peripheral interfaces 906, such as keyboards, mice, touchpads, computer screens, touchscreens, etc., for enabling human interaction with and manipulation of the computing device 102.

The computing device 102 can also include one or more network interfaces 908 for communicating via one or more networks, such as Ethernet adapters, wireless transceivers, or serial network components, for communicating over wired or wireless media using protocols. The computing device 102 can also include one or more storage device 910 of varying physical dimensions and storage capacities, such as flash drives, hard drives, random access memory, etc., for storing data, such as images, files, and program instructions for execution by the one or more processors 902. For example, the one or more storage devices 910 can include the storage device 102.

Additionally, the computing device 102 can include one or more software programs 912, such as the OS 112 and the I/O scheduler 114. The one or more software programs 912 can include instructions that cause the one or more processors 902 to perform the processes described herein. Copies of the one or more software programs 912 can be stored in the one or more memory devices 904 and/or on in the one or more storage devices 910. Likewise, the data, for example, the write history 314, utilized by one or more software programs 912 can be stored in the one or more memory devices 904 and/or on in the one or more storage devices 910.

In implementations, the computing device 102 can communicate with one or more remote computing devices 914 via a network 916. The one or more remote computing devices 914 can be any types of conventional computing devices. For example, the one or more remote computing devices 914 can be desktops, laptops, servers, etc., or mobile devices, such as smart telephones, tablet computers, cellular telephones, personal digital assistants, etc. The network 916 can be any type of network, such as a local area network, a wide-area network, a virtual private network, the Internet, an intranet, an extranet, a public switched telephone network, an infrared network, a wireless network, and any combination thereof. The network 916 can support communications using any of a variety of commercially-available protocols, such as TCP/IP, OSI, FTP, UPnP, NFS, CIFS, and AppleTalk. The network 916 can be, for example, a local area network, a wide-area network, a virtual private network, the Internet, an intranet, an extranet, a public switched telephone network, an infrared network, a wireless network, and any combination thereof.

In implementations, the computing device 102 can exchange data with the one or more remote computing devices 914 over the network 916. For example, the computing device 102 can receive I/O requests for the storage device 104 from the one or more remote computing devices 914. Accordingly, the computing device 102 can utilize the processes described above when processing the I/O requests from the one or more remote computing devices 914. Likewise, the computing device 102 can receive one or more of the write thresholds 120 from the one or more remote computing devices 914.

The computing device 102 and the storage device 104 also can be implemented as part of at least one service or Web service, such as may be part of a service-oriented architecture. For example, the computing device 102 can exchange data with the one or more remote computing systems 914 during operation of the at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In implementations the computing device 102 and the storage device 104 can be utilized as part of a Web server architecture. In the Web server architecture, the computing device 102 can run any of a variety of server or mid-tier applications, including HTTP servers, FTP servers, CGI servers, data servers, Java servers, and business application servers. The computing device 102 also can be capable of executing programs or scripts in response requests from the one or more remote computing devices 914, such as by executing one or more Web applications that may be implemented as one or more scripts or programs written in any programming language, such as Java®, C, C# or C++, or any scripting language, such as Perl, Python, or TCL, as well as combinations thereof. The computing device 102 can also include database servers, including without limitation those commercially available from Oracle®, Microsoft®, Sybase®, and IBM®.

The computing environment 100 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computing device 102 as described above need not be enclosed within a single enclosure or even located in close proximity to one another. Those skilled in the art will appreciate that the above-described componentry are examples only, as the computing device 102 can include any type of hardware componentry, including any necessary accompanying firmware or software, for performing the disclosed implementations. The computing device 102 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include non-transitory computer readable storage devices and media, and signals, in compressed or uncompressed form. Examples of non-transitory computer readable storage devices and media include conventional computer system RAM (random access memory), ROM (read-only memory), EPROM (erasable, programmable ROM), EEPROM (electrically erasable, programmable ROM), and solid state, magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

What is claimed is:

1. A non-transitory computer readable storage medium having stored thereon instructions that when executed by one or more computing systems cause the one or more computing systems to:
   identify a write request to be sent to a storage device;
   determine, from a first counter, that a read request is being held in a first cache waiting to be sent to the storage device;
   determine, from a second counter, a number of read requests that are being held in a buffer of the storage device;
   determine, from a third counter, a number of write requests that are being held in the buffer of the storage device;
   determine a first percentage of write requests among a total of the number of read requests and the number of the write requests that are being held in the buffer of the storage device;
   compare the first percentage to a first threshold;
   in response to the first percentage being less than or equal to the first threshold,
      send the write request to the storage device; and
   in response to the first percentage being greater than the first threshold,
      hold the write request in a second cache for sending to the storage device at a later time.

2. The non-transitory computer readable storage medium of claim 1, wherein the method, in response to the first percentage being less than or equal to the first threshold, further comprises:
   determine, prior to sending the write request to the storage, a total number of input/output (I/O) requests that can be held by the buffer of the storage device;
   determine, prior to sending the write request to the storage, a second percentage of write requests among the total number of I/O requests that can be held by the buffer of the storage device;
   compare the second percentage to a second threshold;
   in response to the second percentage being less than or equal to the second threshold,
      send the write request to the storage device; and
   in response to the second percentage being greater than the second threshold,
      hold the write request the second cache for sending to the storage device at a later time.

3. The non-transitory computer readable storage medium of claim 2, wherein at least one of the first threshold and the second threshold is dynamically adjusted.

4. A computer-implemented method of managing storage, the method comprising:
   identifying a write request to be sent to a storage device;
   determining a number of write requests that are being held by the storage device;
   determining, based at least in part on the number of write requests, a percentage of write requests among a total number of requests that can be held by the storage device;
   comparing, using a processor, the percentage of write requests to a threshold;
   in response to the percentage being less than or equal to the threshold,
      sending the write request to the storage device; and
   in response to the percentage being greater than the threshold,
      holding the write request for sending to the storage device at a later time.

5. The computer-implemented method of claim 4, the method further comprising:
   determining, prior to comparing the percentage to the threshold, that at least one read request is waiting to be sent to the storage device;
   determining a number of read request that are being held by the storage device;
   determining an additional percentage of write requests among a total of the number of write requests and the number of read requests that are being held by the storage device;
   comparing the additional percentage to an additional threshold; and
   determining that that the additional percentage is less than or equal to the additional threshold.

6. The method of claim 5, the method further comprising:
dynamically adjusting at least one of the threshold and the additional threshold based at least in part on an amount of time required by the storage device to complete write requests.

7. The method of claim 6, wherein dynamically adjusting at least one of the threshold and the additional threshold, comprises:
determining that the amount of time required by the storage device to complete write requests is less than a predetermined amount of time; and
increasing at least one of the threshold and the additional threshold in response to the amount of time being less than the predetermined amount of time.

8. The method of claim 5, the method further comprising:
receiving, via a network, at least one of the threshold and the additional threshold.

9. The method of claim 4, the method further comprising:
receiving, via a network, the write request.

10. The method of claim 4, the method further comprising:
identifying, prior to determining the number of write requests, a priority I/O request that is waiting to be sent to the storage device; and
sending, prior to determining the number of write requests, the priority I/O request to the storage device.

11. The method of claim 4, the method further comprising:
determining, in response to holding the write request, that the write request has been held beyond a deadline to send the write request to the storage device; and
determining that the write request is a priority I/O request.

12. A system for managing storage, the system comprising:
at least one solid state storage device; and
at least one processor coupled to the at least one solid state storage device and configured to perform a method comprising:
identifying a write request to be sent to at least one solid state storage device;
determining an expected amount of time required by the at least one solid state storage device to complete write requests;
comparing the expected amount of time to a threshold;
in response to the expected amount of time being less than or equal to the threshold,
sending the write request to the at least one solid state storage device; and
in response to the expected amount of time being equal to or greater than the threshold,
holding the write request for sending to the at least one solid state storage device at a later time.

13. The system of claim 12, wherein determining the expected amount of time comprises:
determining, for one or more previously sent write requests, one or more actual amounts of time required to complete the one or more previously sent write requests; and
determining the expected amount of time based at least in part on the one or more actual amounts of time.

14. The system of claim 13, wherein determining the expected amount of time comprises:
determining a mean value of the one or more actual amounts of time.

15. The system of claim 13, wherein at least one of the one or more actual amounts of time is weighted higher in the determination of the expected amount of time.

16. The system of claim 13, wherein determining the amount of time comprises:
removing, from the determination of the expected amount of time, at least one of the one or more actual amounts of time that differs from others of the one or more actual amounts of time.

17. The system of claim 13, wherein determining the expected amount of time comprises:
selecting the one or more previously sent write requests that occur within a period of time.

18. The system of claim 13, the method further comprising:
storing the one or more actual amounts of time in a history of previously sent write requests.

19. The system of claim 12, the system further comprising:
a network interface coupled to the at least one processor, wherein the at least one solid state storage device provides network-based storage for one or more remote computing devices.

20. The system of claim 19, wherein the at least one processor is further configured to perform the method further comprising:
receiving, via the network interface, the write request.

21. The system of claim 12, wherein the at least one processor is further configured to perform the method further comprising:
dynamically adjusting the threshold.

* * * * *